United States Patent [19]
Green et al.

[11] Patent Number: 6,127,631
[45] Date of Patent: Oct. 3, 2000

[54] CHASSIS SYSTEM FOR CABLE MANAGEMENT

[75] Inventors: Philip Scott Green, Snellville; Richard John Gulley, Lawrenceville, both of Ga.; Tony Mark, Richmond, Canada; Alan J. Schlenz, Snellville; Patrick A. Wolfer, Braselton, both of Ga.

[73] Assignee: Scientific-Atlanta, Inc., Norcross, Ga.

[21] Appl. No.: 09/316,814

[22] Filed: May 21, 1999

[51] Int. Cl.[7] .................................................. H02G 3/00
[52] U.S. Cl. .................... 174/72 A; 174/97; 174/135; 439/212; 361/826; 361/827
[58] Field of Search ................ 174/72 A, 72 R, 174/97, 72 C, 135, 48, 50; 439/212; 361/826, 827

[56] References Cited

U.S. PATENT DOCUMENTS

| | | | |
|---|---|---|---|
| 5,274,194 | 12/1993 | Belcher | 174/50 |
| 5,614,695 | 3/1997 | Navazo | 174/48 |
| 5,942,724 | 8/1999 | Russo et al. | 174/48 |
| 5,973,265 | 10/1999 | O'Brien et al. | 174/72 A |
| 5,998,732 | 12/1999 | Caveney et al. | 174/48 |
| 6,011,221 | 1/2000 | Lecinski et al. | 174/72 A |
| 6,051,790 | 4/2000 | Takeuchi et al. | 174/72 A |

*Primary Examiner*—Kristine Kincaid
*Assistant Examiner*—Dhiru R Patel
*Attorney, Agent, or Firm*—Kelly A. Gardner; Kenneth M. Massaroni; Hubert J. Barnhardt, III

[57] ABSTRACT

A chassis (200) having cable management features includes a frame (210) for holding communication modules (105) that have cables (305) coupled to front surfaces thereof. The chassis also includes cable tunnels (225) formed beneath the frame (210). The cable tunnels (225) are each defined by sidewalls and upper and lower surfaces that form an aperture through the tunnel (225), and the module cables (305) from a particular module (105) can be routed through its associated cable tunnel (225) beneath the frame (210). The chassis (200) also includes cable guides (230), each defining an opening associated with a particular communication module (105), wherein cables (305) coupled to that communication module (105) can be routed through its associated cable tunnel (225) and then through its associated cable guide (230). The cable tunnels (225) and cable guides (230) route cables (305) coupled to corresponding communication modules (105) into groups, each associated with a particular communication module or particular modules (105).

10 Claims, 9 Drawing Sheets

CHASSIS SYSTEM FOR CABLE MANAGEMENT

FIELD OF THE INVENTION

This invention relates generally to frames in which communication equipment is mounted, and more specifically to a chassis for holding transmission and receiving equipment.

BACKGROUND OF THE INVENTION

Communication services providers, such as telecommunications and cable television service providers, generally interconnect a large number of electronic components for signal transmission and reception. Such components may include, for example, broadband headend equipment, node equipment, hub equipment, and any other devices for performing signal operations. Typically, the electronic equipment includes modules that are mounted within a chassis so that cables coupled to a particular module can be routed to one or more other modules that may be mounted within the same chassis or a different chassis.

Figure 1:
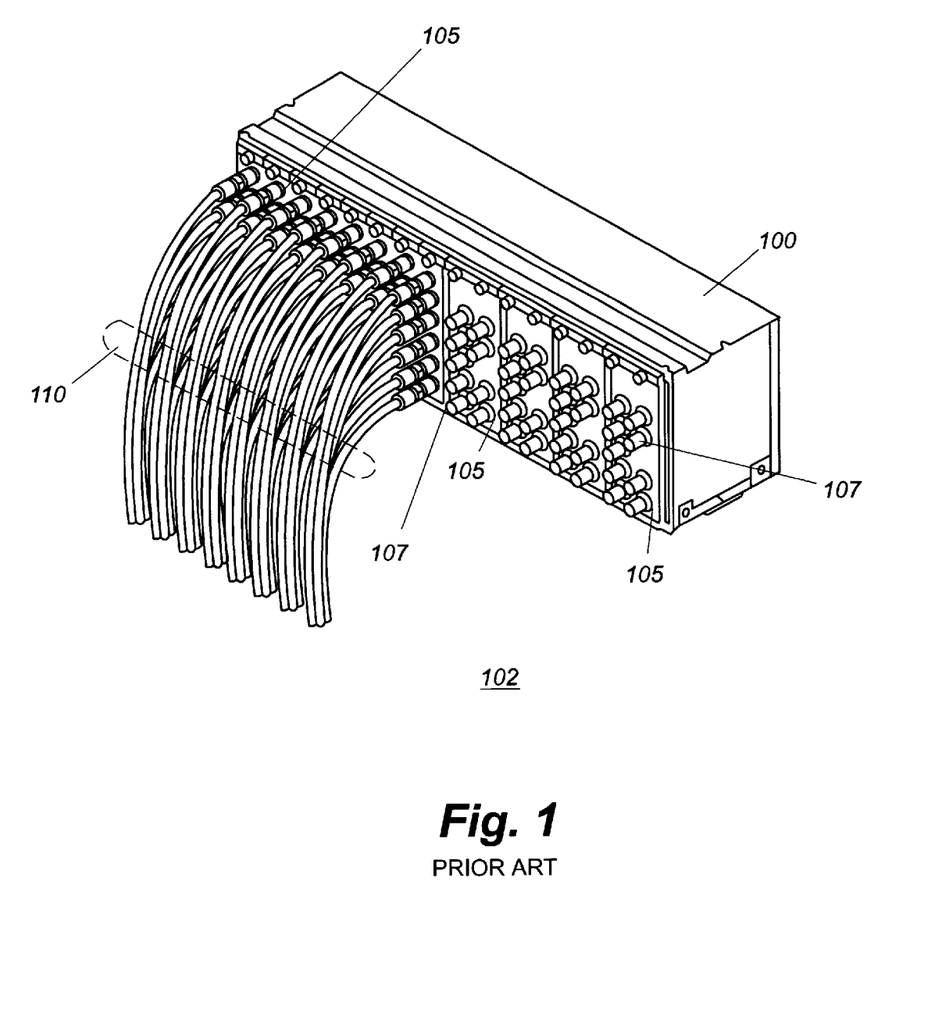
FIG. 1 is a conventional chassis for holding communication equipment.
Figure 2:
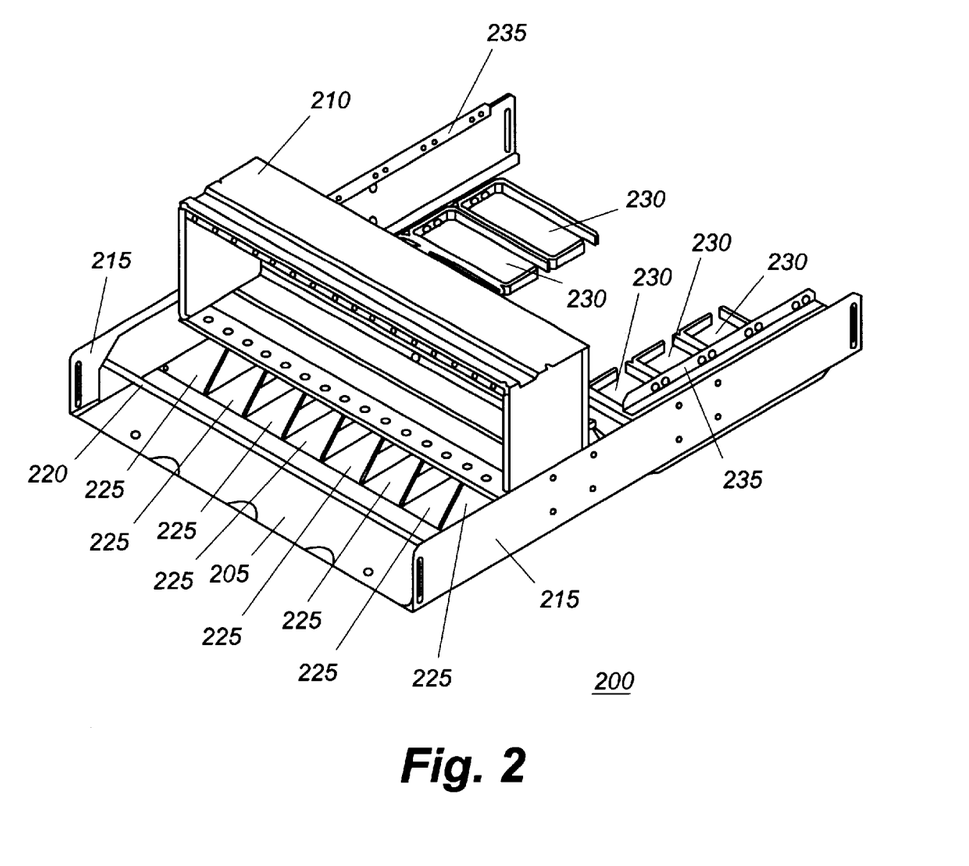
FIGS. 2–5 show a chassis having cable management features in accordance with the present invention.

Referring to FIG. 1, a conventional chassis 102 includes a frame 100 for holding a number of communication modules 105, each of which includes connectors 107 for receiving and transmitting electrical or optical signals. The connectors 107 may be, for instance, coaxial cable connectors. When the communication modules 105 are splitter/combiner modules, they typically input and output radio frequency signals.

As shown, the modules 105 are mounted adjacent to one another and facing in the same direction so that a technician need only access a single side, e.g., the front side, of the chassis for cable connection. The cables 110 are then coupled to the connectors 107 and routed to other equipment (not shown).

As can be seen in FIG. 1, the modules 105 may each include a large number of connectors 107. Therefore, once cables 110 have been connected to the modules 105, each individual cable can be very difficult to identify and to separate from the other cables. As a result, installation and removal of a cable to a particular connector of a particular module can be time consuming. Furthermore, given that each cable, connector, and module is somewhat similar in appearance, erroneous cable installation and removal are unlikely to be detected until electrical malfunctions or signal discontinuities result, after which the single erroneously-connected cable, which is grouped with a multitude of similar cables, must be located and correctly routed and connected.

Thus, what is needed is a cable management system for managing cables in a chassis.

DETAILED DESCRIPTION OF A PREFERRED EMBODIMENT

FIGS. 2–5 show a chassis 200 having cable management features in accordance with the present invention. The chassis 200 has a front region, a middle region, and a back region and includes a substantially planar base 205 having two opposing edges along which rails 215 are formed. The rails 215 are substantially perpendicular to the base and preferably run the length of the chassis 200.

In a middle region of the chassis 200, a module frame 210, which can, for instance, comprise a separately manufactured chassis, is mounted to hold communication modules (not shown), which could be splitter/combiner modules. The frame 210 can be rectangular and manufactured to securely hold a number of rectangular modules or can be any shape designed to accept and securely hold communication modules within the frame 210. Beneath the frame 210 and above the base 205, a number of cable "tunnels", or "channels", 225 are formed. The cable tunnels 225, when rectangular in shape, each include a bottom surface that can be integrally formed with the base 205 or that can be separate therefrom. Sidewalls extend upwards from the bottom surfaces of the tunnels 225 to define side surfaces of the tunnels 225, and top surfaces completely bound an aperture defined by the tunnel surfaces and sidewalls. The top surfaces can be formed by a bottom surface of the frame 210, if desired.

As an additional means for securing and organizing cables, cable holders 260 (FIG. 3) are also formed or installed in the middle region of the chassis 200 behind the frame 210 and cable tunnels 225. Preferably, each cable holder 260 is associated with a single cable tunnel 225 and formed directly behind that tunnel 225. The cable holders 260 can, as shown, be manufactured separately and then mounted to the base 205 such that they extend upward from the base 205 and are substantially perpendicular thereto.

In accordance with the present invention, the chassis 200 further includes a cable support bar 220 mounted between the rails 215 and substantially parallel to the base 205. The cable support bar 220 is preferably formed or installed at the front region of the chassis 200 for the purpose of facilitating the formation of a proper bend radius of the cables.

At the back region of the chassis 200, a number of cable guides 230 are formed. The cable guides 230 can be mounted to cable guide attachment features, e.g., brackets 235, installed or formed on the rails 215 so that they extend inward toward the center of the chassis 200, substantially parallel to the base 205. Each cable guide 230 is preferably formed in the shape of an incomplete rectangle so that cables (not shown) can be inserted into and removed from the guide 230 through a break 270 in the guide 230.

Figure 3:
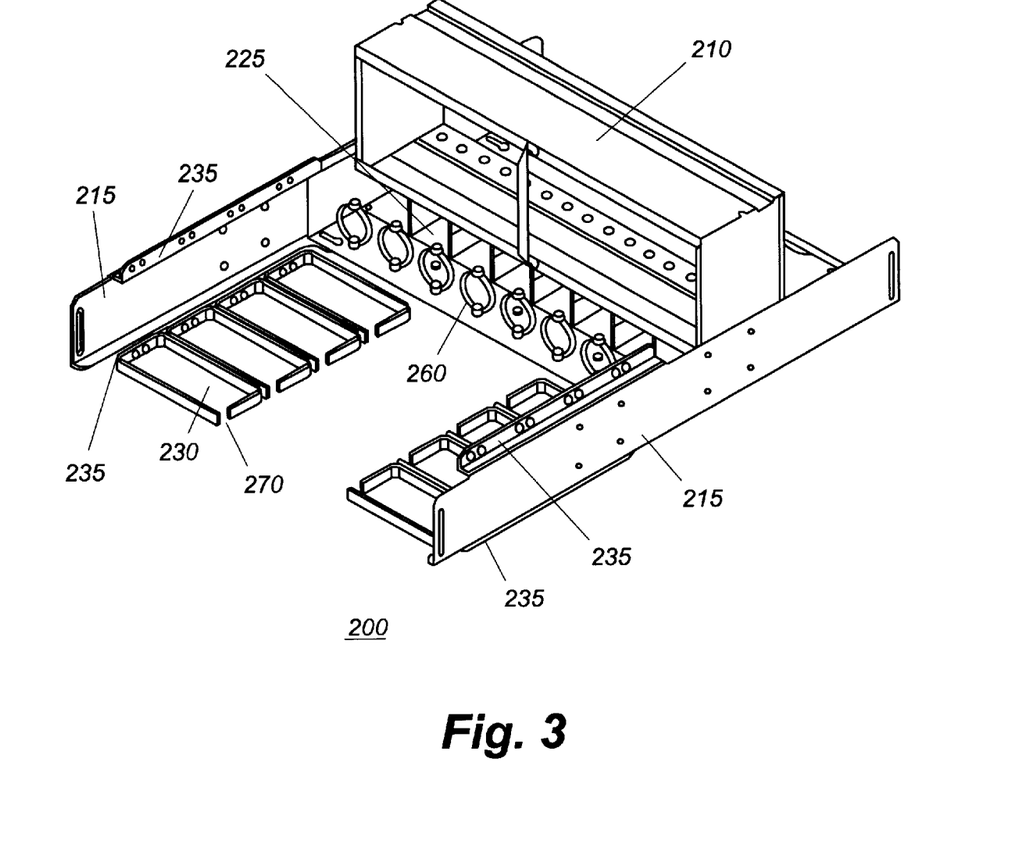
Figure 4:
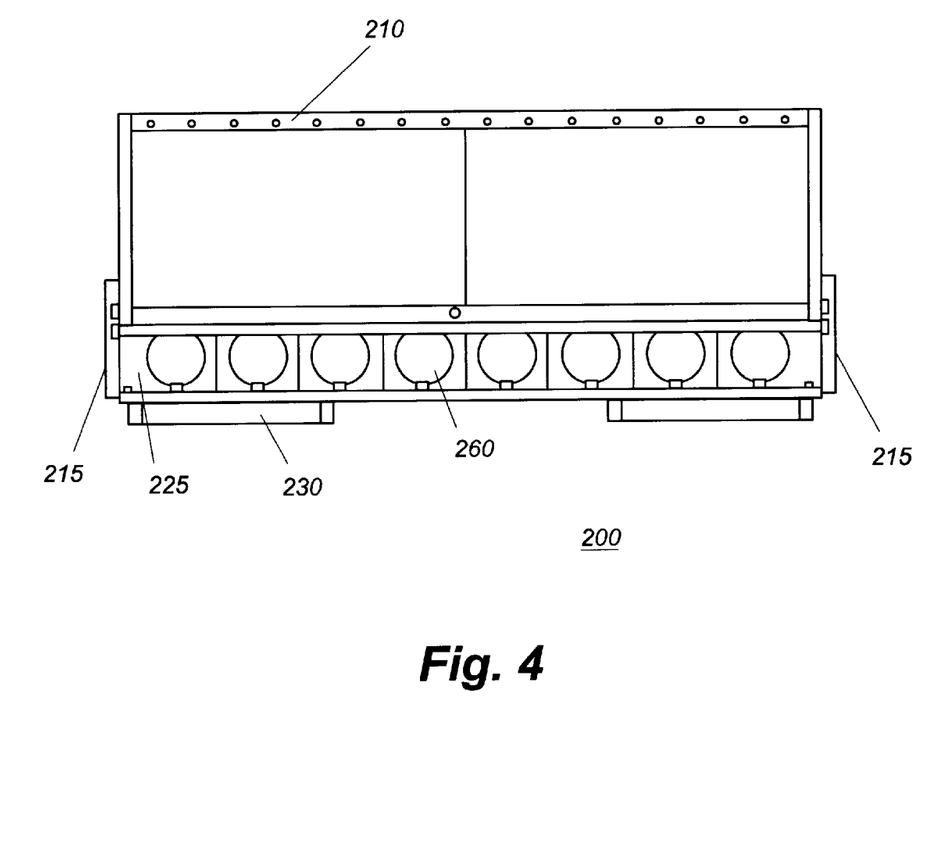
Figure 5:
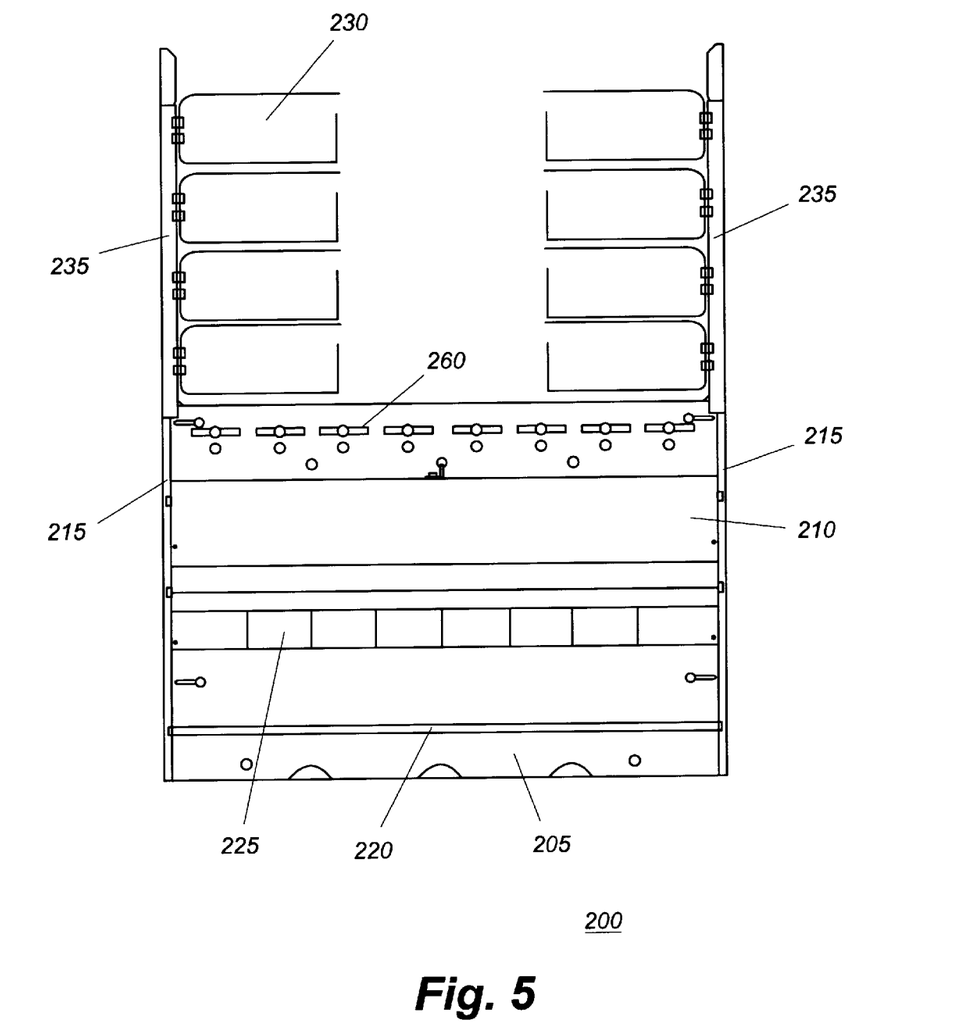

As shown, brackets 235 or other attachments features for securing the cable guides 230 can be located both on the upper and lower portions of the rails 215. Therefore, the cable guides 230 can be relocated from the lower portions of the rails 215 (as depicted in FIG. 3) to the upper portions of the rails 215 if such a configuration is desired.

Figure 6:
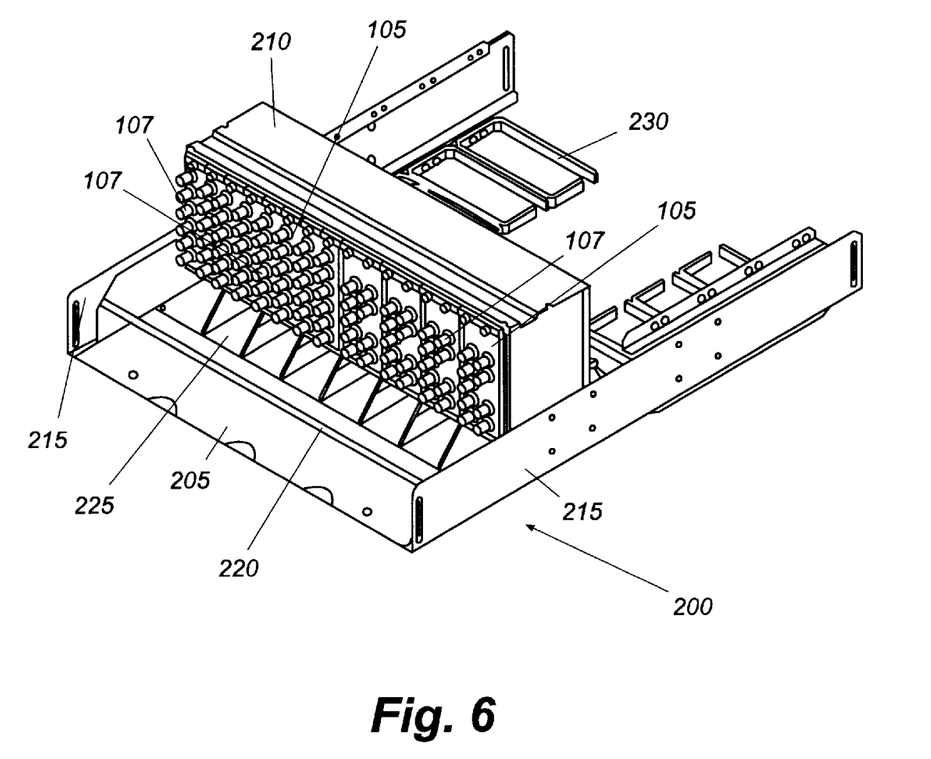
FIG. 6 is a front, angled view of the chassis of FIGS. 2–5 once communication modules have been mounted therein in accordance with the present invention.

Referring next to FIG. 6, the chassis 200 is depicted with communication modules 105 mounted within the frame 210. As shown, the modules 105 are inserted into the frame 210 with connectors 107 facing towards the front region of the chassis 200 and toward the cable support bar 220. According to an alternate embodiment of the present invention, the chassis 200 could instead be mounted to face backwards so that module connectors 107 would face backward rather than forward.

Figure 7:
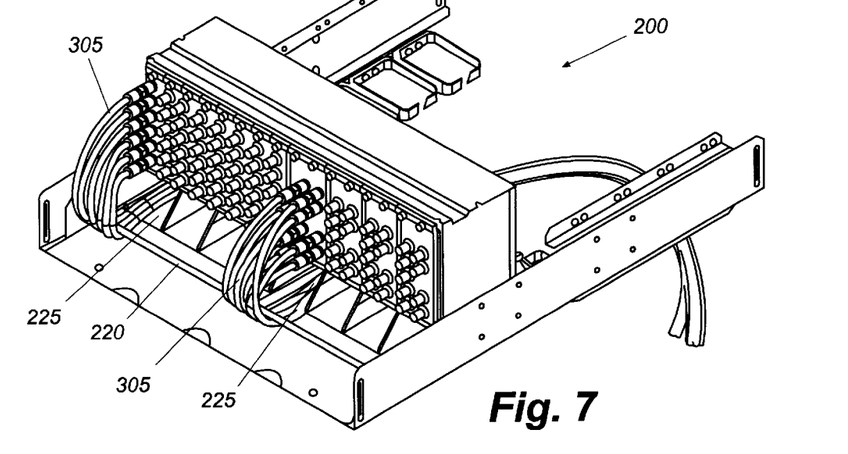
FIGS. 7–12 show the chassis of FIGS. 2–5 once communication modules have been mounted therein and cables connected to the modules in accordance with the present invention.

FIGS. 7–12 show different views of the chassis 200 having the communication modules 105 mounted therein with cables 305 connected to the module connectors 107 of two of the modules 105. In FIG. 7, which is a front, angled view of the chassis 200, it can be seen that the cables 305 have been routed above, around, and then below the cable support bar 220 so that the cables 305 are held away from the modules 105 to create the proper bend radius and facilitate easy removal of the modules 105. The cables 305 are then routed through the cable tunnels 225, with cables from a predetermined number of modules 105 routed through a single cable tunnel 225. Preferably, cables coupled to no more than one or two modules 105 are routed through a single cable tunnel 225 located directly beneath the module(s) 105.

Figure 8:
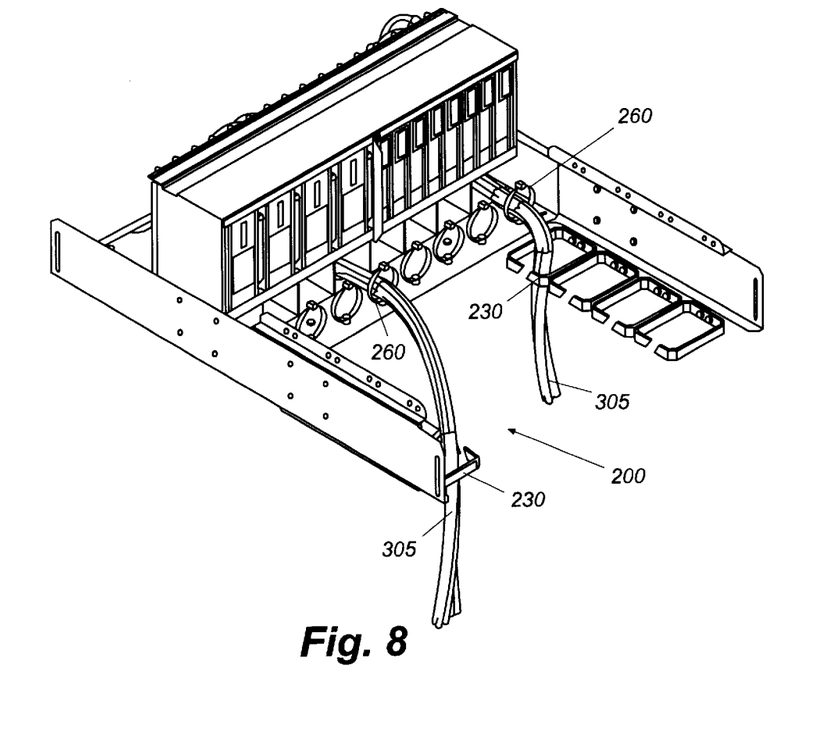
Figure 9:
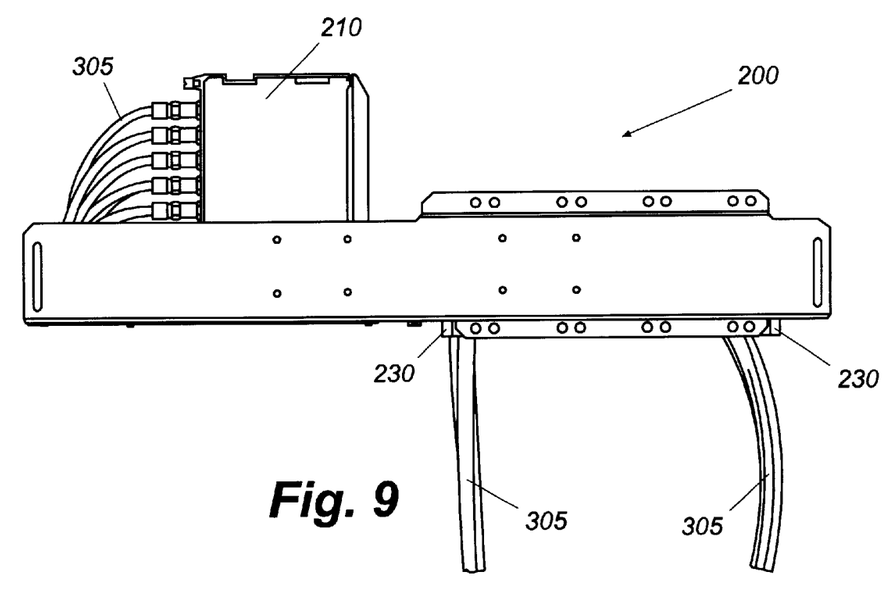
Figure 10:
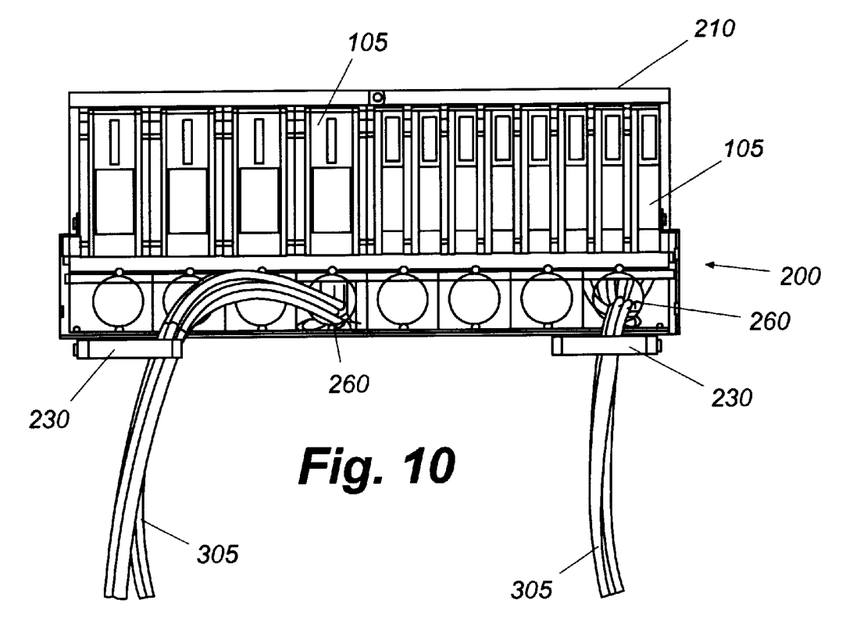
Figure 11:
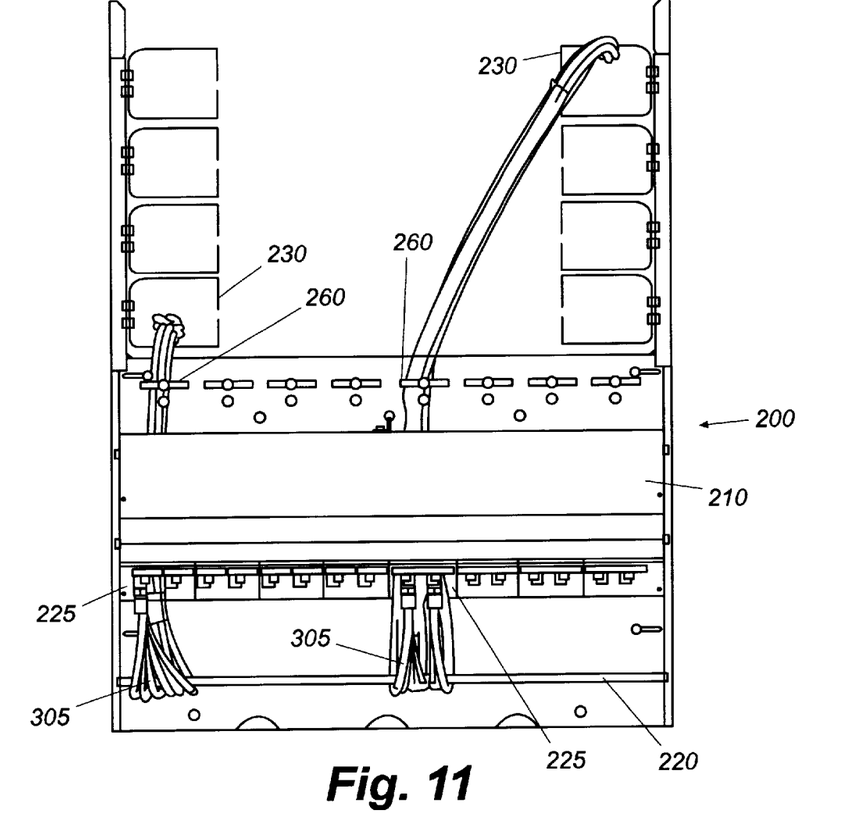
Figure 12:
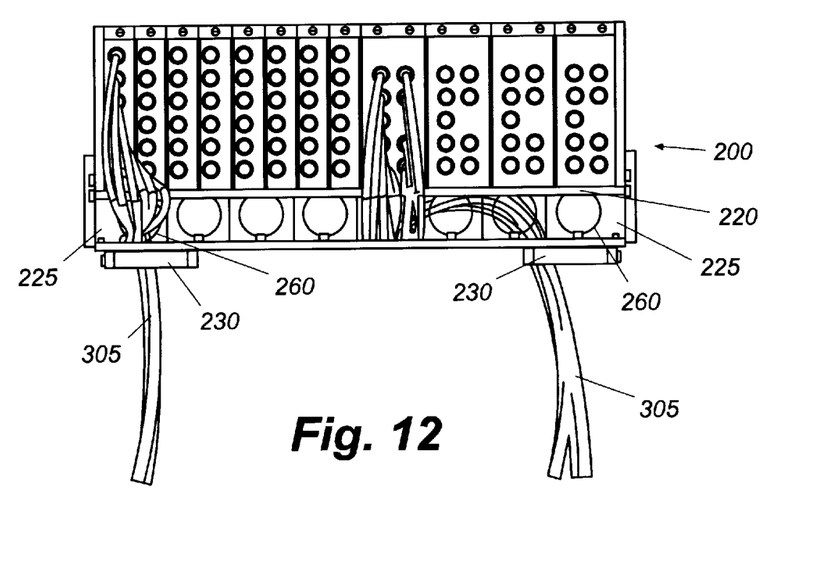

FIG. 8 shows cables 305 from installed modules 105 exiting two cable tunnels 225. The cables 305 extending through each cable tunnel 225 are then guided through the cable holder 260 corresponding thereto. According to a preferred embodiment of the present invention, the cable holder 260 corresponding to a particular cable tunnel 225 is located directly behind that tunnel 225 so that the cables 305 are easily guided through the holder 260. The cables 305 are then finally guided through a cable guide 230 associated with the module 105 to which they are connected. As is the case with the cable tunnels 225 and the cable rings 260, each cable guide 230 is preferably associated with a small number of modules 105, e.g., one or two modules 105, such that all of the cables 305 from a particular module 105 or a particular set of modules 105 (and only the cables 305 from those modules 105) are guided through a single cable tunnel 225, a single cable holder 260, and a single cable guide 230.

The purpose of the cable tunnels 225, the cable holders 260, and the cable guides 230 is to organize the cables 305 on a per-module basis. One of ordinary skill in the art will therefore recognize that the tunnels 225, holders 260, and guides 230 need not necessarily be shaped as shown in the figures. By way of example, the holders 260 could be rectangular or any other shape, and the tunnels 225 and guides 230 could be circular, elliptical, etc. What is important is that the cables 305 be routed through devices that can separate and organize the cables 305 for future manipulation and reconfiguration.

There are several advantages provided by the chassis 200 according to the present invention. First, the cables 305 from each module 105 are neatly stored, bundled, and routed through predetermined holding devices so that they are easily distinguished from other cables managed by the same chassis 200. This permits technicians to better access both the cables 305 and the modules 105 and to easily remove cables 305 and/or modules 105. Furthermore, the chassis 200 is reversible to permit access from the front or the rear.

An additional feature of the chassis 200 is the cable support bar 220, which is mounted a sufficient distance in front of the frame 210 so that cables 305 routed over the bar 220 are prevented from bending too near the connectors 107, which could cause cable damage and equipment malfunctions. The cable support bar 220 also serves to ensure that cables 305 routed around the bar 220 are of sufficient length so that they can be easily connected, disconnected, and manipulated by service technicians.

It will be appreciated by now that there has been provided an improved chassis that provides cable management features. The cable management features of the present invention provide easy access to and manipulation of modules and cables, thereby accommodating a greater density of modules and cables than can be accommodated by a conventional chassis in which communication equipment is mounted.

What is claimed is:

1. A chassis having cable management features, the chassis comprising:
    a frame for holding communication modules, the communication modules having cables coupled to front surfaces thereof;
    cable tunnels formed beneath the frame, the cable tunnels each defining an aperture associated with one of said communication modules,
    cable guides, each defining an opening associated with one of said communication modules, wherein said cables are coupled to one of said communicaton modules and can be routed through said cable tunnel associated with one of said communication modules and then through said cable guide associated with one of said communication modules, wherein the cable tunnels and cable guides route said cables coupled to their ones of said associated communication modules into groups, each of said groups associated with one of said communication modules;
    a base that is substantially planar, that includes top and bottom surfaces, and that has two opposing edges partially defining boundaries of the base, and
    rails formed at the two opposing edges of the base, wherein the rails are substantially perpendicular to the base and extend upward from the base;
    wherein the chassis includes front, middle, and back regions, and wherein the cable tunnels are formed in said middle region of the chassis between the rails.

2. The chassis of claim 1, wherein the base forms a bottom surface of the cable tunnels.

3. The chassis of claim 1, wherein sidewalls formed substantially perpendicular to the base and between the rails form boundaries between the cable tunnels.

4. The chassis of claim 1, wherein a bottom surface of the frame forms top surfaces of the cable tunnels.

5. The chassis of claim 1, further comprising:
    cable support bar mounted between the rails substantially parallel to the base in the front region of the chassis, wherein said cables can be routed around the cable support bar then through the cable tunnels.

6. The chassis of claim 5, wherein the cable guides are located within the back region of the chassis, and wherein the cable guides are formed substantially parallel to the base.

7. The chassis of claim 6, further comprising:
    cable holders formed at exits of the cable tunnels between the cable tunnels and the cable guides for further guiding and grouping said cables.

8. The chassis of claim 7, wherein each of said cable tunnels, each of said cable holders, and each of said cable guides correspond to one of said communication modules for grouping and routing said cables coupled to one of said communication modules.

9. The chassis of claim 8, wherein the cable support bar is located a distance from the frame sufficient to facilitate removal of the communication modules once the cables have been routed through the cable tunnels, cable holders, and cable guides.

10. The chassis of claim 9, further comprising:
    a mounting mechanism for mounting the chassis to other equipment frames.

* * * * *

UNITED STATES PATENT AND TRADEMARK OFFICE
CERTIFICATE OF CORRECTION

PATENT NO. : 6,127,631
DATED : October 3, 2000
INVENTOR(S) : Green, et al.

It is certified that error appears in the above-identified patent and that said Letters Patent is hereby corrected as shown below:

Column 4, line 23, delete "base and" and insert therefore -- base; and --

Signed and Sealed this

Eighth Day of May, 2001

Attest:

NICHOLAS P. GODICI

Attesting Officer     Acting Director of the United States Patent and Trademark Office